United States Patent
Duan et al.

(10) Patent No.: US 10,812,184 B1
(45) Date of Patent: Oct. 20, 2020

(54) SIGNAL ANALYSIS SYSTEMS AND METHODS

(71) Applicants: Lingze Duan, Madison, AL (US);
Dipen K. Barot, Huntsville, AL (US)

(72) Inventors: Lingze Duan, Madison, AL (US);
Dipen K. Barot, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/442,438

(22) Filed: Jun. 14, 2019

Related U.S. Application Data (60) Provisional application No. 62/828,840, filed on Apr. 3, 2019.

(51) Int. Cl.
*H04B 10/079* (2013.01)

(52) U.S. Cl.
CPC .............................. *H04B 10/07953* (2013.01)

(58) Field of Classification Search
CPC ................ H04B 10/505; H04B 10/548; H04B 10/0773; H04B 10/0775; H04B 10/0795; H04B 10/2572; H04B 10/272; H04B 10/541; H04B 13/02; H04B 7/0632; H04B 10/077; H04B 10/07955; H04J 14/02; H04J 14/0298; H04J 11/00; H04J 14/00; H04J 14/007; H04J 3/14
See application file for complete search history.

(56) References Cited

U.S. PATENT DOCUMENTS

| | | | | |
|---|---|---|---|---|
| 7,266,304 | B2 * | 9/2007 | Duraffourg | H04L 9/0852 380/256 |
| 7,555,127 | B2 * | 6/2009 | Nambu | H04L 9/0852 380/256 |
| 8,644,713 | B2 * | 2/2014 | Poulsen | H04B 10/801 398/154 |
| 8,989,599 | B2 * | 3/2015 | Le Taillandier De Gabory | H04B 10/07 398/182 |
| 2008/0097710 | A1 * | 4/2008 | Roth | G01R 29/26 702/69 |
| 2008/0219470 | A1 * | 9/2008 | Kimijima | H04S 1/002 381/92 |
| 2012/0020660 | A1 * | 1/2012 | Le Taillandier De Gabory | H04L 25/14 398/25 |

* cited by examiner

*Primary Examiner* — Amritbir K Sandhu
(74) *Attorney, Agent, or Firm* — Maynard Cooper & Gale P.C.; Jon E. Holland (57) ABSTRACT

The present disclosure generally pertains to signal analysis systems and methods for measuring and characterizing signal attributes, such as noise. A signal analysis system comprises an optical receiver that receives an optical signal and converts the received signal into an electrical signal. A programmable frequency divider divides the frequency of the incoming electrical signal at different division ratios, and a signal analyzer analyzes the resulting signal. In this regard, by increasing the division ratio of the frequency divider and measuring the power spectral density with the signal analyzer at different division ratios, a suitable signal for determining different parameters (e.g., modulation frequency and modulation index) may be found.

10 Claims, 6 Drawing Sheets

SIGNAL ANALYSIS SYSTEMS AND METHODS

CROSS REFERENCE TO RELATED APPLICATION

This application claims priority to U.S. Provisional Application No. 62/828,840, entitled "Frequency-Divider-Aided Frequency Analysis (FDAFA)" and filed on Apr. 3, 2019, which is incorporated herein by reference.

STATEMENT REGARDING FEDERALLY SPONSORED RESEARCH OR DEVELOPMENT

This invention was made with Government support under ECCS1606836 and ECCS1254902 awarded by the National Science Foundation. The Government has certain rights in the invention.

RELATED ART

Many optical domain applications require optical sources of high spectral purity. Measuring the key performance metrics of optical sources can be important so that factors causing instabilities and noise can be identified and mitigated.

As an example, in active locking systems, specificity in laser phase/frequency noise measurement is often desired to understand the factors contributing to laser instability and the scale of instability. Conventionally, measurement of the power spectral density (PSD) of modulation sidebands is often used for characterizing phase and frequency fluctuations from noise. In one PSD measurement method, laser phase and frequency noise may be measured in an RF range by converting the laser spectrum to the RF range and analyzing the signal in the frequency domain. In the frequency domain, sidebands can be identified and used to determine various signal parameters, such as the signal's modulation frequency and modulation index.

However, in the RF range, there are often significant interferers that can greatly distort the signal under analysis. Noise associated with wideband frequency modulation (FM) can be particularly problematic and can distort the signal under analysis such that the sidebands cannot be readily identified. Thus, determining certain signal parameters, such as modulation index and modulation frequency, can be difficult or problematic.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1$a$ is a graph of power versus frequency illustrating an effect of frequency division to reduce sideband amplitude in a case of narrowband tone modulation.

FIG. 1$b$ is a graph of power versus frequency illustrating an effect of frequency division to reduce frequency span in a case of wideband tone modulation with a small division ratio.

FIG. 1$c$ is a graph of power versus frequency illustrating an effect of frequency division to change characteristics from frequency sweeping to discrete sidebands in a case of wideband tone modulation with a large division ratio.

FIG. 1$d$ is a graph of power versus frequency illustrating an effect of frequency division to reduce sideband amplitude in a case of broadband phase modulation.

FIG. 3$a$ depicts a graph of power versus frequency illustrating a response to narrowband frequency modulation (NBFM) without frequency division.

FIG. 3$b$ depicts a graph of power versus frequency illustrating the response of FIG. 3$a$ with a frequency division ratio of 4.

FIG. 3$c$ depicts a graph of power versus frequency illustrating a response to wideband frequency modulation (WBFM) without frequency division.

FIG. 3$d$ depicts a graph of power versus frequency illustrating the response of FIG. 3$c$ with frequency division ratio of 2.

FIG. 3$e$ depicts a graph of power versus frequency illustrating the response of FIG. 3$c$ with a frequency division ratio of 8.

FIG. 3$f$ depicts a graph of power versus frequency illustrating the response of FIG. 3$c$ with a frequency division ratio of 128.

FIG. 3$g$ depicts a graph of power versus frequency illustrating a response to broadband phase modulation (BBPM) without a frequency division.

FIG. 3$h$ depicts a graph of power versus frequency illustrating the response of FIG. 3$g$ with a frequency division ratio of 4.

FIG. 4$a$ depicts a graph of power versus frequency illustrating a frequency-divided beat note with frequency division ratios of 1 (undivided), 4, 8, 16, and 32.

FIG. 4$b$ depicts a graph of power versus frequency illustrating the frequency-divided beat note of FIG. 4$a$ with frequency division ratios of 64, 128, and 256.

FIG. 4$c$ depicts a graph of power versus frequency illustrating the frequency-divided beat note of FIG. 4$a$ with frequency division ratios of 512 and 1024.

DETAILED DESCRIPTION

The present disclosure generally relates to signal analysis systems and methods for measuring and characterizing signal attributes (e.g., noise). In an exemplary embodiment, a signal analysis system comprises an optical receiver that receives an optical signal and converts the received signal into an electrical signal. A programmable frequency divider divides the frequency of the incoming electrical signal at different division ratios, and a signal analyzer analyzes the resulting signal. In this regard, by increasing the division ratio of the frequency divider and measuring the signal power spectral density with the signal analyzer at different division ratios, a suitable signal for determining different parameters (e.g., modulation frequency and modulation index) may be found.

In particular, the division ratio applied by the frequency divider to a signal distorted by wideband FM noise may be dynamically controlled such that the power spectral density (PSD) of the signal is changed. For example, as the division ratio is increased, the curve representing the PSD, amplitude, or other parameter of the signal under analysis is narrowed such that a point is reached at which identifiable sidebands appear in the curve representative of the signal. Thus, the division ratio may be selectively controlled such that a suitable PSD or other type of curve is provided for identification of the sidebands, and the PSD (including the identified sidebands) or other type of curve can be analyzed to determine various parameters of the signal, such as modulation frequency and modulation index. For illustrative purposes, it will be assumed hereafter unless otherwise indicated that system is used to measure a parameter of an optical signal and that the signal analyzer determines a PSD of the signal under analysis, but other types of signals and other types of curves may be measured and determined by the system in other embodiments.

In addition, from direct measurement of a signal's PSD, it may be difficult to differentiate different scenarios of noise. For example, wideband frequency modulation with a large modulation index will often yield a similar spectrum to that of broadband phase modulation. By using the system described above, the aforementioned modulation scenarios may be differentiated in the signal analyzer without ambiguity.

Before discussing details regarding various embodiments of a spectral analysis system, an overview of a mathematical framework for angle modulation (a general term for phase and frequency modulation) will be discussed. In general, a sinusoidal carrier under angle modulation can be described as $$x(t) = A_C \exp\{j[2\pi f_c t + \phi(t)]\} \quad (1)$$

where $A_C$ is carrier amplitude, $f_C$ is carrier frequency and $\phi(t)$ is time varying phase. In case of single tone frequency modulation, where $\phi(t)$ varies according to integration of modulation signal $m(t) = A_m \cos(2\pi f_m t)$, eq. (1) is simplified to $$x(t) = A_C \exp(j2\pi f_c t + j\beta \sin(2\pi f_m t)) \quad (2)$$

where modulation index, $$\beta = \frac{k_f A_m}{f_m},$$

in which $A_m$ is modulation amplitude, $f_m$ is modulation frequency and $k_f$ is frequency sensitivity of the modulator. By defining modulation depth (or frequency deviation) $\Delta f = k_f A_m$, the modulation index can also be expressed as $\beta = \Delta f / f_m$.

When such a signal is divided with a division ratio N, the entire exponent is divided by N and the output signal becomes $$x(t) = A_C \exp\left(j2\pi \frac{f_C}{N} t\right) \exp\left[j\frac{\beta}{N} \sin(2\pi f_m t)\right] \quad (3)$$

By expanding the term exp $$\left[j\frac{\beta}{N} \sin(2\pi f_m t)\right]$$

into an infinite series, the frequency-divided signal is rewritten as $$x(t) = A_C \sum_{n=-\infty}^{+\infty} j_n\left(\frac{\beta}{N}\right) \exp\left[j2\pi\left(\frac{f_C}{N} + jn2\pi f_m\right)t\right] \quad (4)$$

where $$j_n\left(\frac{\beta}{N}\right)$$

in Bessel's function of the first kind of order n with argument $$\left(\frac{\beta}{N}\right).$$

Notably, eq. (2) also describes the case of single tone phase modulation when $\phi(t)$ varies according to $m(t) = A_m \cos(2\pi f_m t)$ in eq. (1) and $\beta = k_p A_m$ where $k_p$ is phase sensitivity of the modulator.

Eq. (4) shows that frequency division causes two changes on an angle-modulated signal: it divides the carrier frequency $f_c$ by N and it divides the modulation index $\beta$ by N. On the other hand, frequency division does not change the modulation frequency $f_m$ and hence the side band spacing remains the same. It should be noted that the relation modulation index, $$\beta = \frac{\Delta f}{f_m}$$

indicates that division of $\beta$ is equivalent to division of modulation depth $\Delta f$.

Empirically, the bandwidth of a frequency modulated signal can be approximately predicted by Carson's rule, bandwidth $BW \approx 2f_m(\beta+1)$.

Figure 1A:
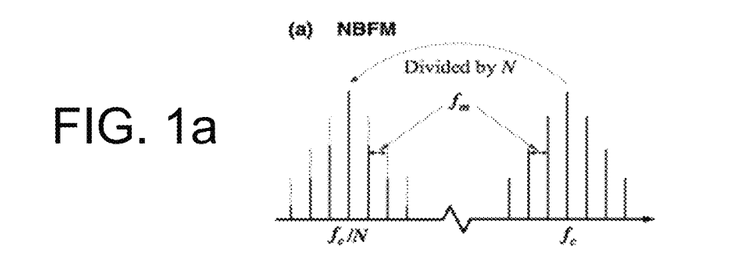

In this regard, when modulation index is less than unity (i.e., $\beta < 1$), representing a narrowband frequency modulation (referred to hereafter as "NBFM") regime, the bandwidth can be approximated to, $BW \approx 2f_m$. The modulation consists of a series of harmonic components at the multiples of modulation frequency $f_m$. Since modulation index $\beta$ is small, the spectrum contains discrete sidebands on both sides of the carrier. Further, on frequency division by a division ratio of N, the signal bandwidth remains the same (or approximately same), since frequency division does not alter modulation frequency $f_m$. However, frequency division reduces the modulation index $\beta$, causing all the sidebands to reduce in amplitude due to linearity of Bessel's function when $\beta < 1$. As a result, the effect of frequency division on a pure NBFM sideband is reduction of amplitude without significant change in the spectral profile, as illustrated in FIG. 1a.

Figure 1B:
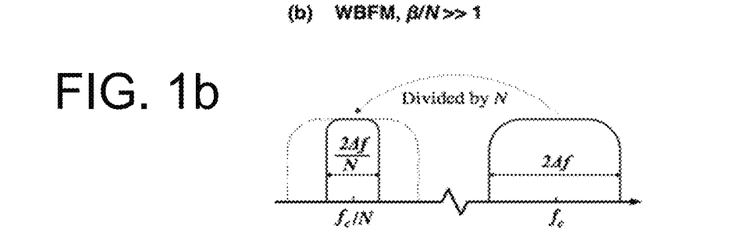

On the other hand, when modulation index is far greater than unity (i.e., $\beta \gg 1$), the bandwidth can be approximated to $BW \approx 2\beta f_m$. Physically, this corresponds to a wideband frequency modulation (referred to hereafter as "WBFM"). In such scenario, the frequency deviation is greater than modulation frequency, i.e., $\Delta f > f_m$ and the carrier frequency sweeps back and forth within a range of $2\Delta f$ at a rate of fm, generating a "flattop" spectrum with a $2\Delta f$ bandwidth, as can be seen in FIG. 1b. When frequency of such a signal is divided by a division ratio of N, the carrier sweeping range decreases due to division of $\beta$ by N. However, as long as $\beta/N > 1$ remains satisfied, the spectrum maintains its "flattop" shape while its bandwidth reduces by a factor of N.

Figure 1C:
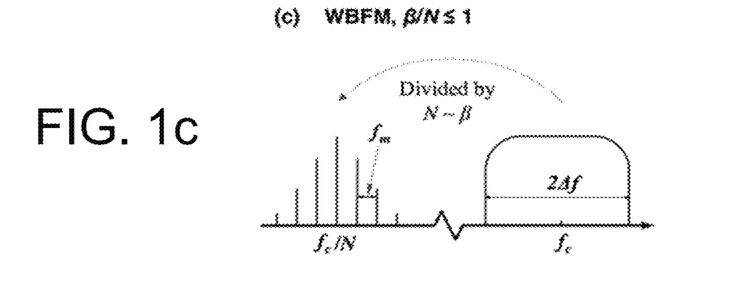

When modulation index $\beta$ of a signal, corresponding to a WBFM regime, is neither too large nor too small and the division ratio is comparable to the modulation index (i.e., $\beta/N \leq 1$), the signal becomes NBFM and discrete sidebands at the harmonics of modulation frequency $f_m$ appear in the spectrum, as shown in FIG. 1c. Hence, such a characteristic transition requires the division ratio N to be at least comparable to the original modulation index $\beta$, which may be used to quantify the scale of $\beta$.

Figure 1D:
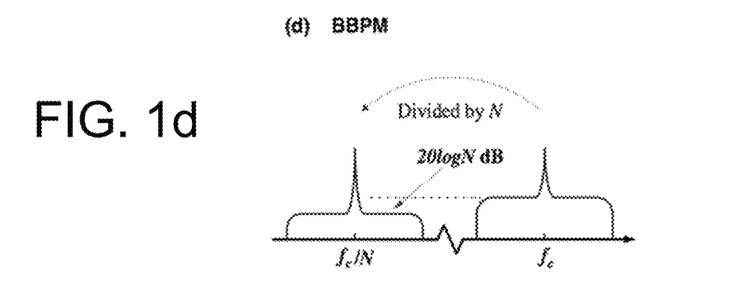

For the scenario of broad band phase modulation (referred to hereafter as "BBPM), the spectrum comprises a continuous band of $f_m$ and across the band modulation index is lesser than unity (i.e., $\beta \ll 1$). The characteristics change of the spectrum due to frequency division in BBPM is reduction in sideband amplitudes just like NBFM, depicted by FIG. 1d. From FIG. 1b and FIG. 1d, frequency division of the angle-modulated signal may clearly distinguish the broadband noise source (i.e., BBPM) with that of a low-modulation frequency with a large modulation index (WBFM).

Figure 2:
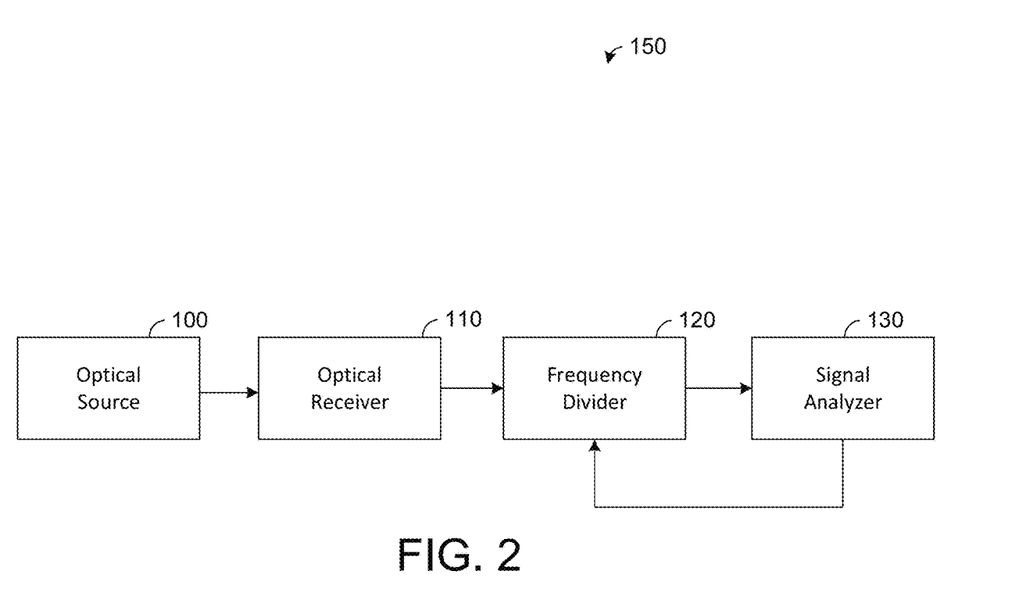
FIG. 2 depicts an exemplary embodiment of a signal analysis system.

FIG. 2 depicts an exemplary embodiment of a signal analysis system 150. In an exemplary embodiment, the system 150 comprises an optical source 100, an optical receiver 110, a programmable frequency divider 120 and a signal analyzer 130, such as a spectrum analyzer. The optical receiver 110 may receive an optical signal from the source 100 and convert the signal from the optical domain to the electrical domain. In an exemplary embodiment, the optical source 100 may comprise a laser, and the optical receiver 110 may comprise an avalanche photodiode (APD) that is configured to generate an electrical signal in response to light incident on the APD. In some embodiments, the electrical signal is a radio frequency (RF) signal. In other embodiments, other types of optical sources and optical receivers are possible, and other frequency ranges for the electrical signal may be used.

The frequency divider 120 is configured to convert the incoming electrical signal to a lower frequency according to a division ratio. For illustrative purposes, the division ratio shall be expressed hereafter as the frequency of the incoming signal (i.e., the signal received by the frequency divider 120) divided by the frequency of the output signal (i.e., the signal output by the frequency divider 120). As an example, a division ratio of N (where N is any positive number) indicates that the frequency of the incoming signal is N times as a large as the frequency of the outgoing signal such that the frequency divider 120 effectively divides the frequency of the incoming signal by N.

In the embodiment shown by FIG. 2, the division ratio is controlled by a control signal received from the signal analyzer 130, as will be described in more detail below. In some embodiments, the frequency divider 120 may be integrated with components of the signal analyzer 130 within a single housing, though it is also possible for the frequency divider 120 to be separate from the signal analyzer 130. In other embodiments, other configurations of the frequency divider 120 may be possible.

The signal analyzer 130 may measure the PSD of the signal output by the frequency divider 120 and analyze the PSD to determine various signal parameters. As an example, the signal analyzer 130 may provide parameters that characterize the noise affecting the received signal. In some embodiments, the signal analyzer 130 is configured to determine at least the modulation frequency and modulation index of the received signal.

In this regard, in some embodiments, the signal analyzer 130 is configured to analyze the measured PSD in the frequency domain to determine whether sidebands are sufficiently discernable from the measured PSD. If not, the signal analyzer 130 may control the frequency divider 120 to increase the division ratio applied by the frequency divider 120 and then check again to determine if the sidebands are discernable. As described in more detail herein, increasing the division ratio has the effect of narrowing the resulting PSD, and if the division ratio is continually increased, a point will be reached at which the sidebands become discernable in the PSD for the signal under analysis. Once the signal analyzer 130 sufficiently identifies the sidebands from the measured PSD, the signal analyzer 130 may then determine various signal parameters, such modulation index $\beta$, as an example, based on the sidebands and the division ratio being applied to the signal.

Figure 3A:
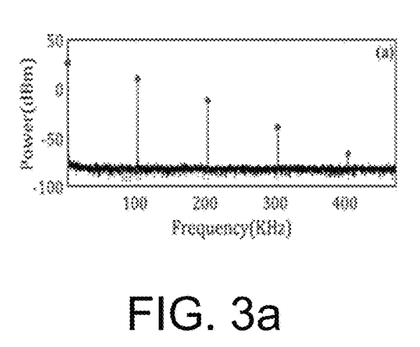
Figure 3B:
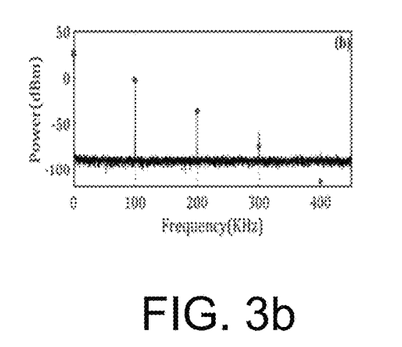

FIG. 3a depicts an exemplary PSD of a signal affected by NBFM without frequency division. That is, the PSD shown by FIG. 3a may be that of a signal distorted by NBFM where the division ratio of the frequency divider 120 is 1. FIG. 3b depicts the PSD of the same signal where the division ratio of the frequency divider 120 is controlled to be 4. This division of frequency results in discrete sidebands of the same spacing but reduced amplitudes, as shown in FIG. 3b.

Figure 3C:
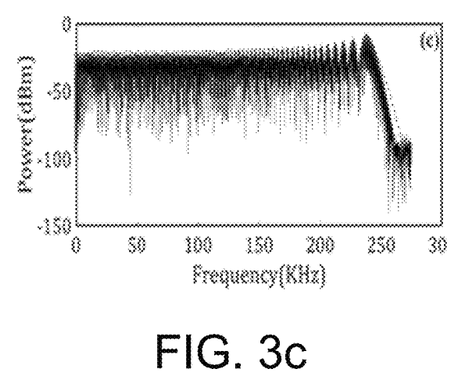
Figure 3D:
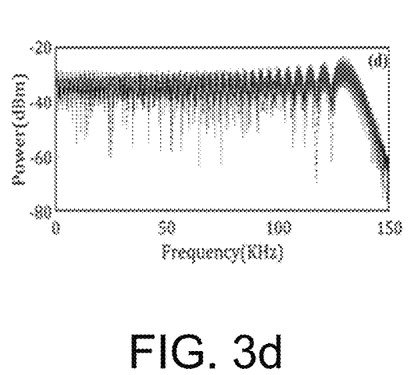
Figure 3E:
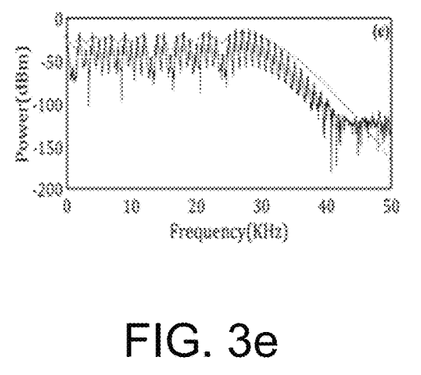

FIG. 3c depicts a PSD of a signal affected by WBFM without a frequency division. That is, the PSD shown by FIG. 3c may be that of a signal distorted by WBFM where the division ratio of the frequency divider 120 is 1. The undivided spectrum of an optical signal, representing a WBFM regime, is a quasi-continuous, flattop sideband. However, the optical signal, when fed to the frequency divider 120 and divided by a division ratio of 'N', yields a spectrum whose spectral width is reduced proportional to the division ratio 'N'. Further, in such an embodiment, the overall profile of the sideband remains the same. As an example, the undivided spectrum is greater than the width of the spectrum with a division ration of 2 (FIG. 3d), which is in turn greater than that of the spectrum with a division ratio of 4 (FIG. 3e), although the profile of the sideband remains the same in these cases.

Figure 3F:
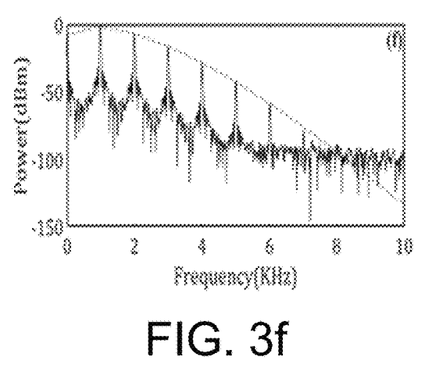

However, if the division ratio is increased further, i.e., the divided modulation index, $$\frac{\beta}{N}$$

approaches unity, the spectrum begins to transform into discrete series of sidebands at the harmonics of a frequency (e.g., modulated frequency '$f_m$'), similar to an NBFM spectrum. As depicted by FIG. 3f, for the division ratio 128, the sidebands are formed at the harmonics of modulated frequency '$f_m$'. In this regard, by finding the division ratio at which the WBFM changes into a NBFM sideband, the value (or approximate value) of modulation index $\beta$ and modulation frequency '$f_m$' of WBFM may be determined and hence the frequency deviation $\Delta f$ may be estimated from the signal analyzer 130.

Figure 3G:
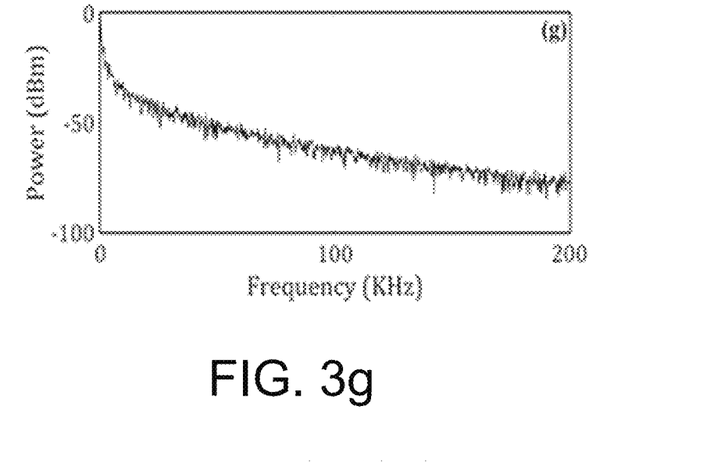
Figure 3H:
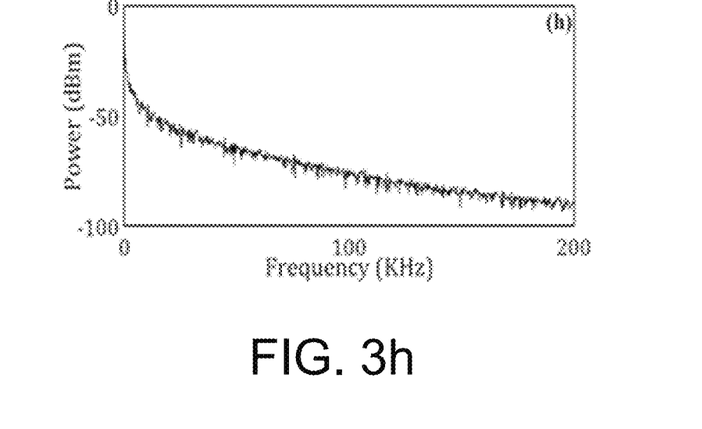

FIG. 3g depicts a graphical representation of a Broad Band Phase Modulation (BBPM) without a frequency division ratio and FIG. 3h depicts a graphical representation of BBPM with a frequency division ratio of 4. In an exemplary embodiment, the undivided spectrum yields a continuous band of frequencies at low modulation indices. When such a signal is divided by frequency divider 120 with a division ratio of 'N' and is analyzed using the analyzer 130, the entire sideband gets lower in amplitude, which is in stark contrast to the spectrum corresponding to WBFM, when divided by a frequency divider 120. In this regard, the WBFM with a large modulation index β may be easily differentiated from the BBPM, by the use of the system 150 described herein.

Figure 4A:
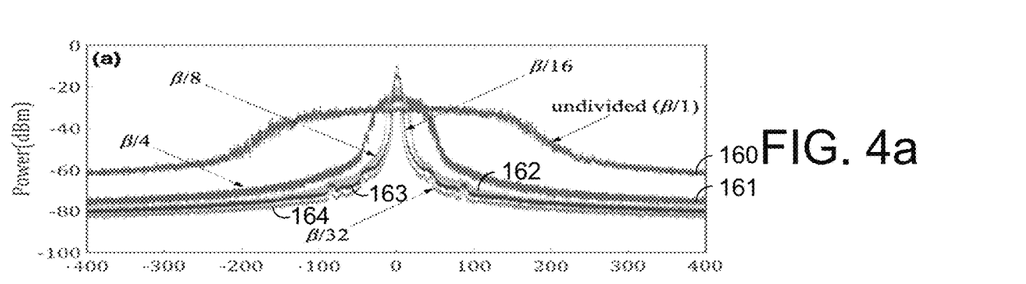
Figure 4B:
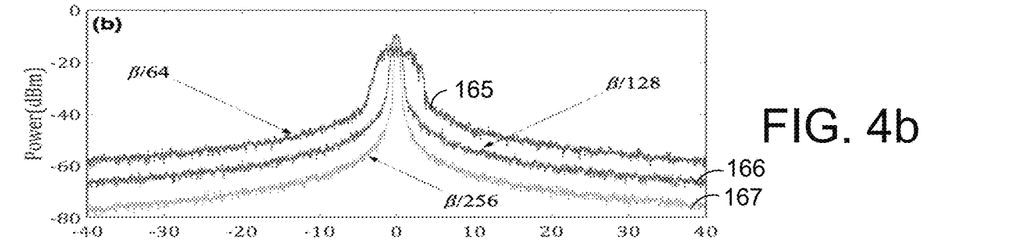
Figure 4C:
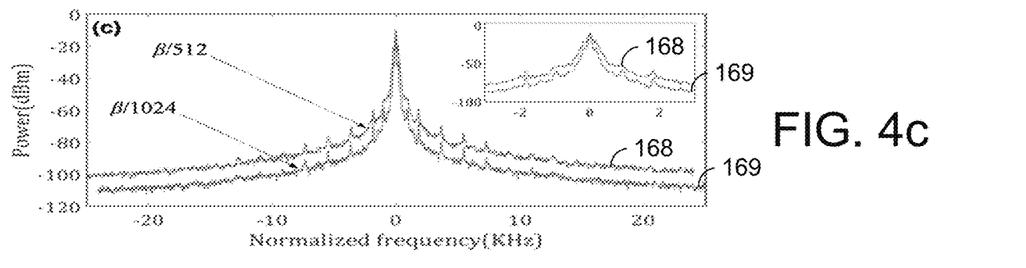

FIG. 4a, FIG. 4b and FIG. 4c depict graphical illustrations of exemplary embodiment of a beat note with different frequency division ratios of 1, 4, 8, 16, 32, 64, 128, 256 and 1024. As an illustrative example, consider a laser locking application where a noisy RF spectrum (e.g., a beat note frequency) is generated by beating a laser source, such as a diode laser with another laser source, such as an optical frequency comb. The mechanism of phase frequency noise of the beat note is essential to design proper locking system. In such application, the beat note constantly drifts throughout the data-acquisition process and it may greatly hinder the conventional techniques for high-resolution spectral analysis (e.g., fast Fourier transform (FFT) analysis). By using the signal analysis system 150 described herein, a high degree of robustness under frequency drift may be demonstrated and fine spectral details may be possible without the need of extensive frequency stabilization.

The undivided beat note 160 represents a WBFM regime where the spectrum is a flattop profile across a frequency range, which in the illustrative example, is about 300 KHz, as can be seen in FIG. 4a. In this regard, to determine the parameters of WBFM, the beat note frequency is divided by using the frequency divider 120, and the signal analyzer 130 is used to analyze the spectrum at different division ratios.

As can be seen in FIG. 4a, the beat note bandwidth of the traces 161, 162, 163, and 164 represent the bandwidth with a division ratio of 4, 8, 16, and 32 respectively. As the division ratio gradually increases, the bandwidth of the beat note decreases in proportion, displaying a WBFM behavior. However, the center regions of the spectrum yield a similar profile as the undivided spectrum and is difficult to determine the modulation parameters. In this regard, the beat note may further be divided until the signal transforms into a NBFM to determine the modulation parameters.

As the division ratio is further increased, the linewidth of the beat note reduction continues, as depicted by FIG. 4b, which depicts the signal at different division ratios of 64, 128 and 256, represented by the traces 165, 166, and 167 respectively. In such an embodiment, the center regions of the aforementioned spectra continue to reveal a flattop feature, since the divided modulation index (i.e., β/N>1) remains large throughout the frequency division.

When the division ratio is raised to 512, a set of discrete peaks at the harmonics of a particular frequency appears, represented by the trace 168 in FIG. 4c. Notable, NBFM sidebands emerge on opposite sides of the carrier peak, represented by trace 168 in FIG. 4d. On further division of the signal, at division ratio of 1024, the peaks at the harmonics of the frequency remain at the same frequencies (relative to the frequency at the division ratio of 512), but their amplitudes reduce, confirming their NBFM nature. Meanwhile, other NBFM sidebands may be revealed at other frequencies, as depicted by trace 169 in FIG. 4c. The modulation parameters such as modulation frequency, modulation index and frequency deviation can be determined by analyzing the NBFM sidebands of the optical signal and thereby, the sources of noise may be easily determined and may be addressed to provide a stable optical source.

By using the signal analysis system 150, common PFN situations such as WBFM and BBPM may be differentiated without ambiguity. Moreover, the system allows for quantitative determination of WBFM parameters such as modulation frequency, modulation index and FM frequency deviation, which is difficult or impossible with conventional signal analysis systems.

Figure 5:
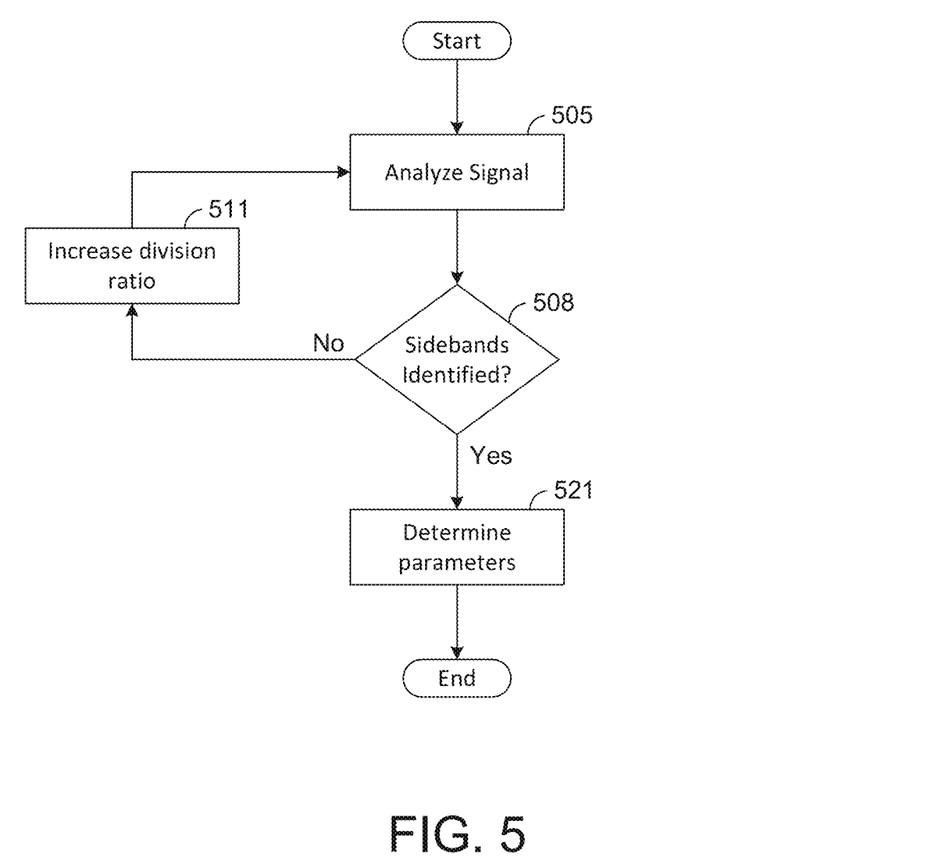
FIG. 5 is a flow chart illustrating an exemplary method for analyzing a signal to determine parameters characterizing noise.

An exemplary use and operation of the system 150 will be described in more detail below with particular reference to FIG. 5.

In this regard, initially referring to FIG. 1, the optical source 100 generates an optical signal for which it is desirable to measure and characterize noise characteristics. The optical receiver 110 receives the optical signal 110 and converts the optical signal to an electrical signal. The optical receiver 110 further applies a Fourier transform in order to convert the electrical signal from the time domain to the frequency domain.

Initially, the signal is not divided by the frequency divider 120 (e.g., the frequency divider 120 applies a division ratio of 1). For illustrative purposes, assume that the signal has the PSD shown by trace 160 of FIG. 4a. The signal analyzer 130 receives the signal from the frequency divider 120 and analyzes the received signal in an attempt to identify sidebands in such signal, as shown by blocks 505 and 508 of FIG. 5. As shown by FIG. 4a, the signal has no discernible sidebands so that the signal analyzer 130 makes a "no" determination in block 508. Thus, as shown by block 511, the signal analyzer 130 provides a control signal to the frequency divider for causing the frequency divider 120 to apply a higher division ratio to the signal. As an example, the frequency divider 120 might increase the division ratio to 2. After the division ratio is increased, the signal is again analyzed in blocks 505 and 508 of FIG. 5.

This process of increasing the division ration and then analyzing the signal is continued until the signal analyzer 130 is able to identify sidebands in the received signal. In such case, the signal analyzer makes a "yes" determination in block 508, and then analyzes the current signal to determine parameters characterizing the noise in the signal, as shown by block 521 of FIG. 5. As an example, the signal analyzer 130 may use the identified sidebands to determine the modulation frequency and modulation index. These parameters may be stored for later analysis or displayed to a user as may be desired.

In various embodiments described above, the system is used to measure and characterize an attribute of an optical signal. However, as mentioned above, similar techniques may be used to measure and characterize attributes of other types of signals, such as an RF signal. Further, the signal analyzer 130 may measure attributes of a signal other than PSD, such as the power or amplitude of an RF signal or other type of signal. In such other embodiments, the use of an optical source and an optical receiver is unnecessary.

Now, therefore, the following is claimed:

1. A signal analysis system, comprising:
   a programmable frequency divider configured to receive an electrical signal and apply a division ratio to the electrical signal for dividing a frequency of the electrical signal according to the division ratio, thereby providing a frequency-divided signal having a frequency less than the frequency of the electrical signal received by the programmable frequency divider; and
   a signal analyzer configured to receive the frequency-divided signal and analyze the frequency-divided signal for determining a signal parameter for the electrical signal, the signal analyzer further configured to transmit to the programmable frequency divider a control signal for controlling the division ratio applied to the electrical signal by the programmable frequency divider, wherein the signal analyzer is configured to increase the division ratio in response to a determination that the signal analyzer is unable to identify sidebands in the frequency-divided signal, and wherein the signal analyzer is configured to identify the sidebands in the frequency-divided signal after increasing the division ratio and determine the parameter based on the identified sidebands.

2. The system of claim 1, further comprising an optical receiver configured to receive an optical signal and convert the optical signal into the electrical signal.

3. The system of claim 1, wherein the signal parameter is for charactering noise affecting the electrical signal.

4. The system of claim 1, wherein the signal parameter is a modulation index for the electrical signal.

5. The system of claim 1, wherein the signal parameter is a modulation frequency for the electrical signal.

6. A signal analysis method, comprising:
dividing a frequency of an electrical signal with a programmable frequency divider, thereby providing a frequency-divided signal having a frequency less than the frequency of the electrical signal;
analyzing the frequency-divided signal with a signal analyzer;
determining that the signal analyzer is unable to identify sidebands in the frequency-divided signal;
controlling with the signal analyzer a division ratio applied to the electrical signal by the programmable frequency divider based on the analyzing, wherein the controlling comprises increasing the division ratio in response to the determining that the signal analyzer is unable identify the sidebands in the frequency-divided signal;
identifying the sidebands in the frequency-divided signal with the signal analyzer after the increasing the division ratio; and
determining a signal parameter for the electrical signal based on the analyzing identified side bands.

7. The method of claim 6, further comprising:
receiving an optical signal at an optical receiver; and
converting the optical signal into the electrical signal.

8. The method of claim 6, wherein the signal parameter is for characterizing noise affecting the electrical signal.

9. The method of claim 6, wherein the signal parameter is a modulation index for the electrical signal.

10. The method of claim 6, wherein the signal parameter is a modulation frequency for the electrical signal.

* * * * *